Patented June 8, 1954

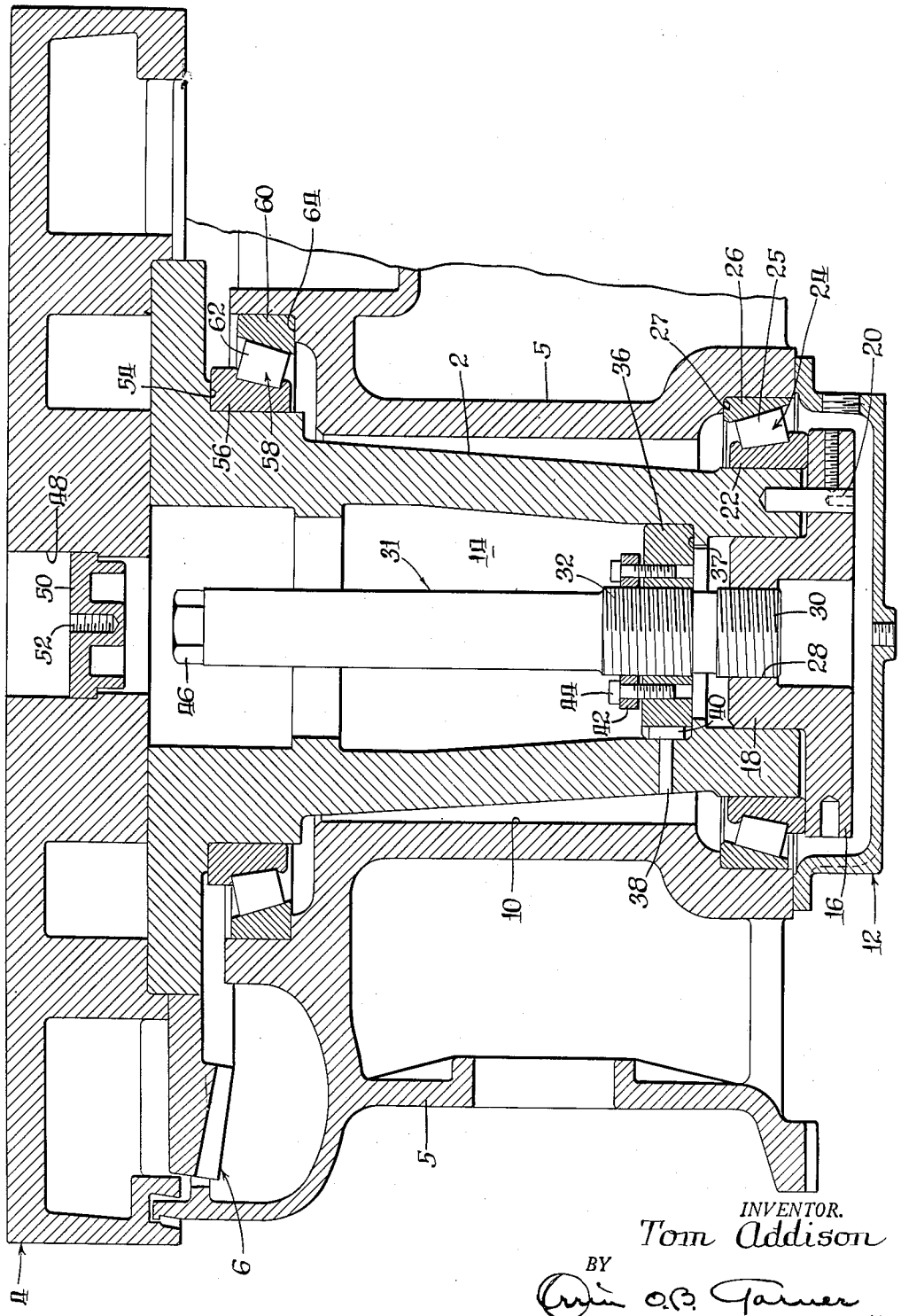

2,680,658

UNITED STATES PATENT OFFICE 2,680,658

BORING MILL BEARING

Tom Addison, Cincinnati, Ohio, assignor to American Steel Foundries, Chicago, Ill., a corporation of New Jersey Application February 6, 1952, Serial No. 270,133

11 Claims. (Cl. 308—227)

1

This invention relates to bearings and more particularly to a novel adjustable bearing arrangement for hollow rotatable members such as the spindle of a conventional boring mill.

A primary object of the invention is to devise a bearing arrangement such as above described which is so arranged as to provide easy access for adjustment.

Another object of the invention is to eliminate the necessity for a deep pit in the floor which supports the frame for the spindle.

Still another object of the invention is to avoid the necessity for draining the bearing lubricant before readjusting the bearings.

A further object of the invention is to devise bearing adjustment means having a very powerful mechanical advantage.

The foregoing and other objects and advantages of the invention will become apparent from a consideration of the following specification and the accompanying drawing, wherein the single figure is a central, vertical, sectional view through a boring mill embodying the novel bearing arrangement.

Describing the invention in detail and referring to the drawing, the novel bearing arrangement illustrated as applied to a hollow spindle 2, supporting a rotatable table 4 of a conventional boring mill, the frame of which is illustrated at 5. The table is rotated by a gear 6 adjacent its periphery.

The spindle is sleeved within an opening or chamber 10 of the frame, and the lower end of said opening is sealed by a cap 12 removably attached to the frame 5 in any convenient manner as by cap screws (not shown) to retain bearing lubricant within the chamber 10.

The spindle 2 is hollow and comprises an internal passage 14 extending from end to end thereof, the lower end of said passage being provided with a bearing or threaded abutment member 16, preferably in the form of a plate as illustrated in the drawing, said abutment 16 having an annular boss 18 slidably fitted in the lower end of the passage 14 in substantially fluid tight engagement therewith.

The plate 16 is provided with one or more dowel pins 20 slidably fitted within complementary openings of the spindle 2 at the lower end thereof for the purpose of interlocking the spindle 2 and plate 16 against relative rotational movement about the longitudinal axis of the spindle 2 during rotation of the spindle on said axis.

The upper side of the plate 16 is spaced from

2 the lower end of the spindle 2 and affords a bearing seat for an inner race 22 of a conventional roller thrust bearing 24 having a plurality of rollers 25 and having an outer race 26 fitted within a complementary recess of the frame 5 and bearing against a downwardly facing shoulder or abutment surface 27 thereof.

The boss 18 of the plate 16 is provided with a threaded opening 28, the threads of which are mated with threads 30 of a differential adjusting screw generally designated 31 whereby the screw 31 is rotatably connected to the plate 16 for support and adjustment thereof, as hereinafter described. The screw 31 also comprises threads 32 which are substantially finer than the threads 30 and are mated with corresponding threads of a movable nut or threaded abutment member 36 seated against an upwardly facing shoulder 37 of the spindle 2 within its passage 14, whereby the screw 31 is rotatably connected to said member 36 for support of the screw and adjustment of the plate 16, as hereinafter described. The nut 36 is provided with a snug slidable fit within the passage 14 and is keyed for rotational movement with the spindle 2 by a pin key 38 having a flat head 40 slidably fitted within a complementary groove of the nut 36 extending lengthwise of the spindle 2.

The screw 31 is releasably locked against accidental rotation thereof relative to the nut 36 by a lock nut 42 having threads mating with the screw threads 32, and the lock nut 42 is secured to the nut 36 by one or more lock screws 44.

The upper end of the screw is provided with wrench engaging means preferably in the form of a hexagonal head 46 in vertical alignment with an opening 48 through the table 4, said opening being normally closed by a readily removable plug 50, having a threaded opening 52 for convenient engagement with a complementary threaded tool (not shown), which may be utilized to lift the plug 50 from the opening 48 to provide convenient access to the screw head 46.

The spindle 2 is also provided adjacent its upper end with a downwardly facing shoulder or bearing seat 54 seated on an inner race 56 of a conventional thrust roller bearing 58 having an outer race 60 and having a plurality of rollers 62 confined between the races 56 and 60. The outer race 60 is seated against an upwardly facing shoulder 64 of the frame 5. The upper rollers 62 and the lower rollers 25 are arranged in converging relationship toward the spindle 2 whereby upon removal of the plug 50 and release of the lock screws 44, a wrench or other convenient tool (not shown) may be engaged with the screw head 46 to rotate the screw 31, thereby tightening both bearings 24 and 58. It may be noted in this connection, that the threads 30 and 32 of the screw 31 are preferably both right-handed or both left-handed in order to afford a powerful mechanical advantage as well as fine adjustment of the bearings.

It will also be understood, that the above described arrangement provides easy access to the screw 31 to accommodate adjustment of the bearings 24 and 51 without the necessity of removing the cover plate 12 or draining the bearing lubricant within the frame passage 10. Furthermore, the hollow boss 18 affords a passage through which the lubricant contacts the threads 28.

I claim:

1. In a bearing arrangement for a hollow spindle rotatable within a passage of a frame; the combination of a downwardly facing shoulder on said spindle, a roller thrust bearing carried by the frame and supporting said shoulder, an upwardly facing shoulder on said spindle internally thereof, a nut within the spindle seated against said upwardly facing shoulder, a plate having a hollow boss snugly fitted within the lower end of the spindle, said plate having an upwardly facing surface engaged with said other bearing, a differential adjusting screw having threads mating with corresponding threads of the boss and having other relatively fine threads mating with corresponding threads of the nut, a wrench engaging portion on the top of said screw, a work support table carried by the top of said spindle and having an opening aligned with said portion, and a readily removable plug in said opening whereby upon removal of the plug and actuation of said portion both of said bearings are tightened.

2. In a bearing arrangement for a hollow rotatable spindle within a passage of a frame; the combination of a nut slidably fitted within the spindle and seated against an upwardly facing surface thereof, a plate having a hollow boss slidably fitted within the lower end of the spindle, an adjusting screw having relatively coarse threads mating with complementary threads of the boss and having relatively fine threads mating with corresponding threads of the nut, all of said threads running in the same direction, a thrust type roller bearing carried by the frame and supporting a downwardly facing surface of the spindle, and another thrust type roller bearing carried by the frame and engaging the plate.

3. In a bearing arrangement for a hollow spindle rotatable within an opening of a frame; the combination of a roller thrust bearing carried by the frame and supporting a downwardly facing surface of the spindle, a nut slidably fitted within the spindle and seating against an upwardly facing surface thereof, a bearing retainer plate at the lower end of the spindle, a differential adjusting screw having relatively coarse threads mating with corresponding threads of the plate, said screw having relatively fine threads mating with corresponding threads of the nut, another roller thrust bearing engaging the spindle and carried by the frame and plate, and means on the upper end of the screw for actuation thereof.

4. A bearing arrangement, according to claim 3, wherein the plate is provided with a lubricant passage connecting the frame opening to the coarse threads of the screw at a point below the nut, whereby bearing lubricant in said passage lubricates the mating threads of the plate and screw.

5. A bearing arrangement, according to claim 3, wherein the spindle is provided with means for positively interlocking the plate and nut for rotation as a unit therewith, said means accommodating relative movement between the plate, the nut and the spindle, lengthwise of the spindle.

6. In a bearing arrangement for a hollow spindle rotatable within an opening of a frame; the combination of an abutment slidably fitted in the spindle and seated against a shoulder thereof, another abutment, a screw having threaded portions of different pitch in complementary threaded engagement with respective abutments, mutually facing surfaces on said spindle and said other abutment, and roller thrust bearing units carried by the frame, each of said units having an inner race seated against one of the surfaces.

7. In a bearing arrangement for a hollow spindle; the combination of an external shoulder on the spindle facing one end thereof, an internal shoulder within the spindle facing the other end thereof, a roller bearing having a race seated against said external shoulder, a threaded nut seated against the internal shoulder, an adjusting screw having threads engaging mating threads of said nut, said screw having other coarser threads, a plate having threads mating with said coarser threads, and another roller bearing having an inner race seated against a surface of the plate facing said other end of the spindle whereby rotation of said screw tightens both of said bearings.

8. A bearing arrangement, according to claim 7, wherein means are provided on the plate and nut engaged with means of the spindle to prevent rotation of the spindle relative to the plate and nut, and to accommodate relative movement between the spindle, plate and nut, lengthwise of the spindle.

9. A bearing arrangement for a rotatable hollow spindle within an opening of a frame, said arrangement comprising a threaded abutment member within the spindle and carried thereby, a second threaded abutment member, capable of movement relative to the first mentioned abutment member lengthwise of the spindle, a bearing seat fixed to the spindle against movement away from the second abutment member, said bearing seat facing the second abutment member, thrust bearings carried by the frame and seated, respectively, against the second abutment member and against the bearing seat, and means for adjusting said bearings comprising a screw in threaded engagement with the threaded abutment members.

10. A bearing arrangement for a hollow rotatable spindle within a frame opening, said arrangement comprising spaced roller thrust bearings within the frame opening, a plate at one end of the spindle engaging one of the bearings, a nut housed within the spindle and seated against a surface thereof facing away from the plate, said spindle having a surface facing toward the plate and engaging the other of said bearings, and means for adjusting said bearings comprising a member in threaded engagement with the nut and plate.

11. In a bearing arrangement for a substantially vertical, hollow spindle rotatable on a substantially vertical axis within an opening of a frame; the combination of an abutment member having an upwardly facing bearing seat, said spindle having a downwardly facing bearing seat about the first mentioned seat, thrust bearings carried by the frame in said opening, said thrust bearings tapering toward each other and comprising inner races seated against the respective seats, a member within the spindle and carried thereby, an adjuster screw having a rotatable connection to said last mentioned member for support of said screw, said screw having a rotatable connection to the first mentioned member for support thereof, at least one of said connections being a threaded connection to accommodate adjustment of both bearings by rotation of the screw, and tool engaging means on said screw above the second mentioned member whereby said screw may be rotated by a tool inserted into the hollow spindle from the upper end thereof.

References Cited in the file of this patent

UNITED STATES PATENTS

| Number | Name | Date |
|---|---|---|
| 2,005,123 | Zerbe | June 18, 1935 |
| 2,068,523 | Trosch | Jan. 19, 1937 |
| 2,585,828 | Pearson | Feb. 12, 1952 |

FOREIGN PATENTS

| Number | Country | Date |
|---|---|---|
| 579,667 | Great Britain | Aug. 12, 1946 |